Oct. 7, 1924.                                                     1,510,889
D. C. HOOKER
MANUFACTURE OF GEARS AND APPARATUS THEREFOR
Filed Jan. 3, 1923
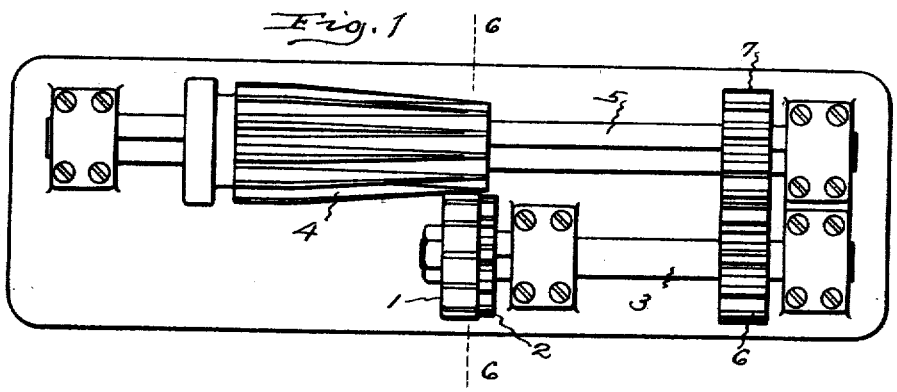
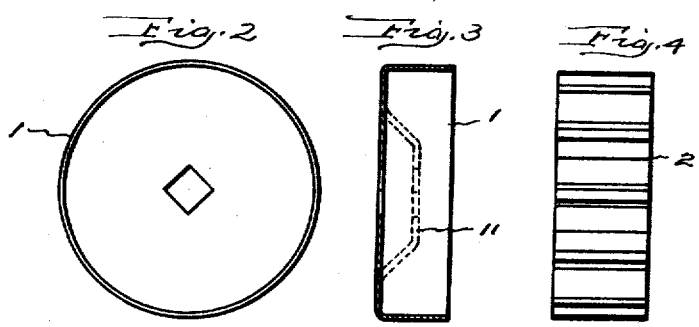
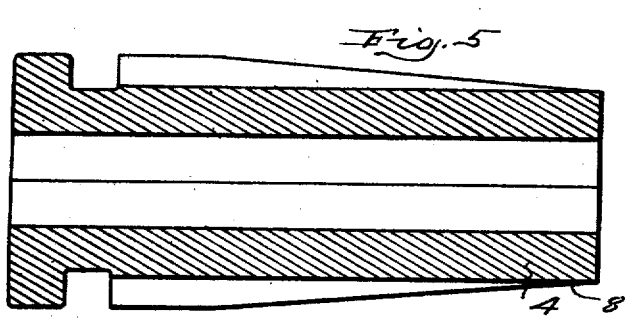
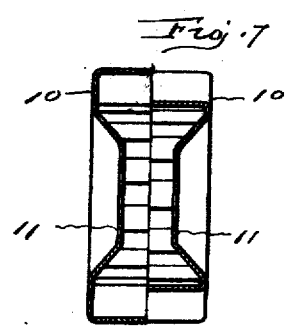
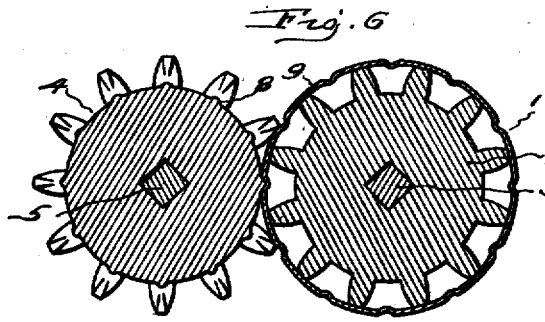
INVENTOR
Duncan C. Hooker
by Harry P. Williams
atty.

Patented Oct. 7, 1924.

1,510,889

UNITED STATES PATENT OFFICE.

DUNCAN C. HOOKER, OF FARMINGTON, CONNECTICUT.

MANUFACTURE OF GEARS AND APPARATUS THEREFOR.

Application filed January 3, 1923. Serial No. 610,416.

*To all whom it may concern:*

Be it known that I, DUNCAN C. HOOKER, a citizen of the United States, residing at Farmington, in the county of Hartford and State of Connecticut, have invented a new and useful Improvement in the Manufacture of Gears and Apparatus Therefor, of which the following is a specification.

This invention relates to a method of producing spur gears. There are many machines, devices and apparatus designed for relatively light duty employing gears for which cast gears are crude and unsatisfactory, stamped sheet metal gears are too narrow and light, and machined gears unnecessarily heavy and expensive.

The object of this invention is to provide a simple, cheap process by the practice of which spur gears with accurate, strong, wide and smooth teeth of approved form and required pitch may be rapidly produced from sheet metal blanks.

In practicing this process a cup-shaped shell is pressed up from sheet metal and the rim of such a blank passed between a toothed rotating matrix and toothed rotating hob which so intermesh that the rim of the blank is rolled into teeth of the desired shape.

In the accompanying drawings Figure 1 shows a plan of a machine which may be employed in forming spur gears according to this process. Fig. 2 shows a face view of a blank. Fig. 3 is a diametrical section of the blank. Fig. 4 shows an edge view of a toothed matrix. Fig. 5 shows a section of a toothed hob. Fig. 6 is a transverse section on plane indicated by dotted line 6—6 on Fig. 1, illustrating the action of the hub and matrix on the rim of a blank. Fig. 7 shows a diametrical section of two gears formed by this process placed face to face with their teeth staggered.

A cup-shaped shell or blank 1 is stamped and turned up or punched to the required shape and dimensions from sheet metal of suitable gage by any well known method. This shell or gear blank is applied to or slipped upon a rotatable form or matrix 2 having teeth of shape, dimensions and pitch corresponding to those of the ultimate gear to be formed, but that are of course smaller in cross section, depending on the gage of the metal of the blank. This toothed matrix is mounted upon a rotatable shaft 3. The hob 4 has gear teeth of similar shape, dimensions and pitch, that are extended axially and tapered from full size to merely rudimentary form. The toothed hob is mounted so that it may be reciprocated longitudinally on a rotatable shaft 5. Any suitable means may be provided for reciprocating the hob on its shaft. The matrix shaft and the hob shaft are supported parallel with each other in ordinary bearings and are provided with intermeshing gears 6 and 7 so that they will rotate synchronously. Any convenient driving means may be employed for rotating the shafts, and the elements are so timed and adjusted that the teeth of the matrix and the hob intermesh and register properly but do not contact.

The hob is drawn back and a blank is placed over the matrix. When the machine is started the rudimentary ends 8 of the teeth of the hob are first engaged with the rim 9 of the blank on the matrix and slightly indent the metal of the blank between the teeth of the matrix.

As the process of indenting the edge of the blank is continued the hob is advanced gradually deepening the depressions until finally, when the full diameter of the hob is in register with the matrix, the rim of the blank is formed to the shape of the desired gear teeth. Should any of the metal between the teeth bulge when the rim of the blank is being rolled, this metal may be flattened out by punch and die or other common means, or drawn in when the face of the blank is pressed in to form the web 11.

If desired two of the gears 10 thus formed may be mounted or assembled face to face with the teeth staggered in order to eliminate vibration and noise and give additional strength and substantial appearance. By this method spur gears having practical accuracy and considerable strength and good wearing qualities may be produced very rapidly from sheet metal of any desired character.

The invention claimed is:

1. The method of producing a spur gear which consists in forming a cup-shaped sheet metal blank and compressing the rim of the blank with gradually increasing pressure between intermeshing toothed rotating surfaces.

2. The method of producing a spur gear which consists in forming a cup-shaped sheet metal blank and subjecting the rim of the blank to the indenting action of intermeshing toothed revolving surfaces and gradually increasing the depth of the indentations thus formed.

3. The method of producing a spur gear which consists in cupping a blank of sheet metal and passing the rim of the cup-shaped blank between the teeth of intermeshing gears which are rotated synchronously and moved axially with relation to each other, whereby said rim is gradually formed into gear teeth.

4. An apparatus for forming sheet metal gears which comprises a rotatable toothed matrix, a rotatable toothed hob, the teeth of which matrix and hob intermesh but do not engage, means for rotating said matrix and hob synchronously and means whereby the depth of intermesh of said teeth may be varied.

5. An apparatus for forming sheet metal gears which comprises a rotatable matrix having gear teeth, a rotatable hob having gear teeth, the teeth of said matrix and hob intermeshing and the teeth of the hob being tapered from full size to substantially nothing, and means for rotating the matrix and hob synchronously.

DUNCAN C. HOOKER.